United States Patent
Hamstra et al.

(10) Patent No.: US 8,027,137 B2
(45) Date of Patent: Sep. 27, 2011

(54) POWER FILTER

(75) Inventors: James Robert Hamstra, Tigard, OR (US); John MacAskill, Belfast (GB); Kieran Miller, San Jose, CA (US); Aaron Jungreis, Richardson, TX (US); Dan Gorcea, Ottawa (CA)

(73) Assignee: Flextronics AP, LLC, Broomfield, CO (US)

( * ) Notice: Subject to any disclaimer, the term of this patent is extended or adjusted under 35 U.S.C. 154(b) by 81 days.

(21) Appl. No.: 12/497,351

(22) Filed: Jul. 2, 2009
(Under 37 CFR 1.47)

(65) Prior Publication Data
US 2010/0259100 A1     Oct. 14, 2010

Related U.S. Application Data

(63) Continuation of application No. 12/336,311, filed on Dec. 16, 2008, now abandoned, which is a continuation of application No. 12/133,077, filed on Jun. 4, 2008, now abandoned, which is a continuation of application No. 11/938,098, filed on Nov. 9, 2007, now abandoned.

(60) Provisional application No. 60/865,334, filed on Nov. 10, 2006.

(51) Int. Cl.
*H02H 9/00* (2006.01)
(52) U.S. Cl. .................................................. 361/119
(58) Field of Classification Search .................. 361/119
See application file for complete search history.

(56) References Cited

U.S. PATENT DOCUMENTS

| 5,206,779 | A | 4/1993 | Sato et al. |
| 5,287,008 | A * | 2/1994 | Pahr ........................... 307/91 |
| 6,301,095 | B1 | 10/2001 | Laughlin et al. |
| 2003/0128557 | A1 | 7/2003 | Coffey et al. |
| 2003/0197998 | A1 | 10/2003 | Coffey et al. |
| 2005/0083132 | A1 | 4/2005 | Tsuruya |

OTHER PUBLICATIONS

PCT Application No. PCT/US07/084345 Entitled "Power Filter," International Filing Date Nov. 9, 2007, Notification Concerning Transmittal of Copy of International Preliminary Report on Patentability dated May 22, 2009.
PCT Application No. PCT/US07/084345 Entitled "Power Filter," International Filing Date Nov. 9, 2007, Notification of Transmittal of the International Search Report and the Written Opinion of the International Searching Authority, or Declaration dated Mar. 12, 2008.

* cited by examiner

*Primary Examiner* — Stephen W Jackson
(74) *Attorney, Agent, or Firm* — Per H. Larsen; Robert G. Crouch; Marsh Fischmann & Breyfogle LLP

(57) ABSTRACT

Generally, a DC power filter and its associated components are presented herein. The DC power filter may operate in a telecommunications chassis between one or more electrical sources and one or more loads. A common mode noise shunt may be included to shunt noise from more than one of the electrical sources or loads together. Additionally, the DC power filter may include protection circuitry that is coupled to more than one of the electrical sources. The protection circuitry may include a combination of diodes and other transient voltage suppression devices.

25 Claims, 7 Drawing Sheets

POWER FILTER

CROSS REFERENCE TO RELATED APPLICATION

This application is a continuation which claims priority from U.S. patent application Ser. No. 12/336,311 filed Dec. 16, 2008, entitled "Power Filter" and U.S. patent application Ser. No. 12/133,077 filed Jun. 4, 2008, entitled "Power Filter" and U.S. patent application Ser. No. 11/938,098 filed Nov. 9, 2007, entitled "Power Filter" and U.S. Provisional Application No. 60/865,334 filed Nov. 10, 2006, entitled "Power Filter", the entire contents of each of which are incorporated by reference herein.

BACKGROUND

It is common to group modern telecommunication equipment together in the same chassis, housing, or building. For example, in base stations of cellular telecommunications systems, there may be a small building that houses a variety of types of telecommunication equipment grouped together in one or more telecommunication rack or chassis. A central office (CO) may include a much larger building with multiple racks of telecommunication equipment and telecommunication chassis, each rack containing multiple telecommunication circuit cards that may perform different functions. In each of these and other situations, the telecommunication equipment within a single building may all be powered by the same power source, such as an AC/DC power converter or DC batteries.

In such situations, equipment in one telecom chassis may add electrical noise to the DC power lines, which may be passed to other telecom chassis that are connected to the same DC power source. Telecom organizations have set standards for the acceptable level of electrical noise that can be passed by a telecommunication device.

Traditionally, telecom circuit cards have been designed to have power filtering thereon. More recently, it has become desirable to have power filtering instead performed at the chassis level, in order to allow more flexibility in design for the telecom circuit cards. Typically, Y2 isolation capacitors have been used in power filters, in part because of their ability to handle high voltages and because, when they fail, they fail in a predictable fashion that results in an open circuit. Unfortunately, however, Y2 isolation capacitors are very large in volume relative to other types of capacitor and they provide a low amount of capacitance relative to similarly sized capacitors of other types.

When building a power filter at the chassis level, the volume required to do all of the filtering with Y2 isolation capacitors would be impractical. Conversely, if the power filtering were not performed with capacitors, then very large inductors would be needed. Unfortunately, this would also be impractical, due to the large volume and expense of the inductors. Furthermore, conventional power filters have included field effect transistors (FETs) in series with the load in order to reduce the in-rush current into the filter capacitors. But with the large amount of current flow through and filtering required of power filters at the chassis level, the power dissipation and heat generated by such FETs in series with the load can become unacceptable for a large chassis.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects of thereof are described and illustrated in conjunction with systems, tools, and methods which are meant to be exemplary and illustrative, and not limiting in scope. In various embodiments, one or more of the above-described problems have been reduced or eliminated, while other embodiments are directed to other improvements.

According to a first aspect, a circuit in a telecommunications chassis that receives DC power from a plurality of power line pairs and provides power, to a plurality of loads within the chassis is provided. The circuit includes a plurality of branch circuits, each branch circuit being associated with one of the power line pairs and connected to one or more loads within the chassis, each branch circuit including a plurality of capacitors therein to filter out noise. The circuit also includes a common mode noise shunt that is coupled to each of the plurality of branch circuits, wherein the common mode noise shunt couples together common mode noise from more than one of the branch circuits to provide filtering of the common mode noise.

According to a second aspect, a circuit in a telecommunications chassis that receives DC power from a plurality of power line pairs and provides power to a plurality of loads within the chassis is provided. The circuit includes a plurality of branch circuits, each branch circuit being associated with one of the power line pairs and connected to one or more loads within the chassis, each branch circuit including a plurality of capacitors therein to filter out noise. The circuit also includes a plurality of protection circuits, each protection circuit being coupled to more than one of the branch circuits, wherein the plurality of protection circuits operate to protect the circuit from abnormal power conditions.

According to a third aspect, a circuit in a telecommunications chassis that receives DC power from a plurality of power line pairs and provides power to a plurality of loads within the chassis is provided. The circuit includes a plurality of branch circuits, each branch circuit being associated with one of the power line pairs and connected to one or more loads within the chassis, each branch circuit including a plurality of capacitors therein to filter out noise. The circuit also includes a field effect transistor disposed in series with at least one of the plurality of capacitors.

Various refinements exist of the features noted in relation to the various aspects. Additionally, further features may be incorporated in the various aspects. These refinements and additional features may exist individually or in any combination, and various features of the various aspects may be combined. For example, the common mode noise shunt may include a bridge that couples more than one branch circuit together. The bridge may include a field effect transistor or a capacitor. Additionally, the branch circuits may include a capacitor protection network that includes a transient voltage suppressor or a diode to protect the filter capacitors from power surges.

In addition to the exemplary aspects and embodiments described above, further aspects and embodiments will become apparent by reference to the drawings and by study of the following descriptions.

DETAILED DESCRIPTION

Reference will now be made to the accompanying drawings, which assist in illustrating the various pertinent features of the present invention. Although the present invention will now be described primarily in conjunction with a DC power filter for a telecommunications chassis, it should be expressly understood that the present invention may be applicable to other applications where it is desired to reduce the noise passing through a circuit. In this regard, the following description of a DC power filter for a telecommunications chassis is presented for purposes of illustration and description. Furthermore, the description is not intended to limit the invention to the form disclosed herein. Consequently, variations and modifications commensurate with the following teachings, and skill and knowledge of the relevant art, are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

Figure 1:
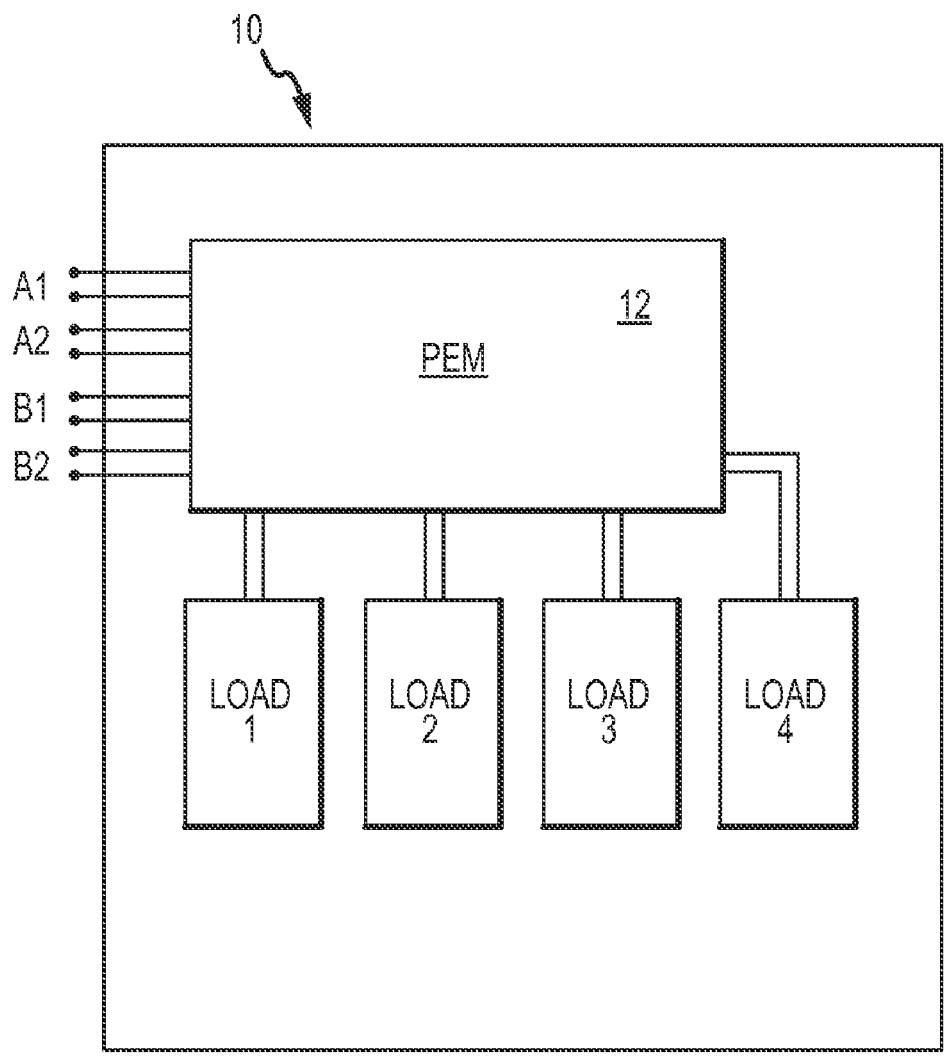
FIG. 1 is a simplified block diagram of a telecommunications chassis that includes a Power Entrance Module (PEM).

Portions of a telecommunication chassis 10 are shown in FIG. 1. Four different power line pairs (labeled A1, A2, B1, and B2) supply DC power to a Power Entrance Module (PEM) 12 in the chassis 10. In this example, each power line pair includes a line return and a line −48VDC. In this regard, the power line pairs A1 and A2 may be connected to an external DC power source (A) and the power line pairs B1 and B2 could be connected to another DC power source (B). The chassis 10 is shown to have four load circuits (i.e., Load1, Load2, Load3, and Load4) that are connected to the PEM 12. Each load circuit may represent one or more telecommunication circuit cards. The number of external power sources, power line pairs from each power source, and loads shown are merely exemplary.

Many telecommunications chassis (e.g., the chassis 10) employ redundant power distribution systems. Generally, there are two PEMs (e.g., the PEM 12) in a single chassis. Each circuit card of the chassis draws power from one PEM 12 via one of the A power load circuits (e.g., Load1 or Load2) and from the other PEM 12 via one of the B power load circuits (e.g., Load3 or Load4). Such may advantageously ensure power availability to each circuit card in the event of a failure of either PEM 12 or in the event of a failure of either the A or the B power line sources to both PEMs. However, current flows may be unbalanced in individual load circuits (e.g., Load1, Load2, Load3, or Load4) because a circuit card connected to Load1 of a PEM and Load3 of another PEM can draw current from the positive side of Load1 of the first PEM and return current to the negative side of Load3 of the second PEM. For example, while the net current flow through all of the power line pairs (A1, A2, A3, and A4) of both PEMs may be balanced, the current flows in each direction through individual power line pairs can unbalance in an unpredictable and dynamically changing manner. These large and unpredictable unbalanced current flows present yet another challenge for designing an effective PEM that is addressed with a PEM common mode noise shunt 22, which is described in detail below.

Figure 2:
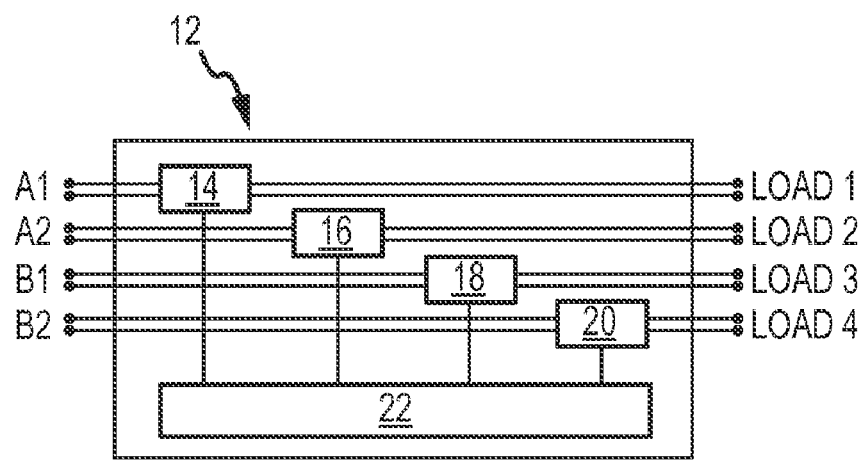
FIG. 2 is a simplified block diagram of the PEM of FIG. 1.

The PEM 12 is shown in further detail in FIG. 2. As can be seen, the PEM 12 includes four PEM branch circuits 14, 16, 18, and 20, that each receive input power from a different one of the power line pairs A1, A2, B1, B2 and that each supply power to a different one of the loads. Each of the PEM branch circuits 14, 16, 18, and 20 is also connected to the PEM common mode noise shunt 22.

Each PEM branch circuit 14, 16, 18, and 20 is substantially identical, so a detailed description of only the PEM branch circuit 14 will be provided. As will be seen, the PEM branch circuit 14 includes different groups of capacitors and inductors that interact to filter out different portions of the frequency spectrum of noise on the power line pair. In addition, different types of capacitors are used in the different groups. For example, relatively small capacitance but high voltage Y2 capacitors may be used for high frequency attenuation of noise entering from the power line side of the circuit while a combination of lower voltage chip capacitors and electrolytic capacitors may be used in conjunction with inductors for broadband frequency attenuation of noise entering from both ends of the circuit. Common mode noise is collected, at a point labeled in FIG. 3 as the residual common mode noise collection node 72. Noise may pass to the residual common mode noise collection node 72 via the banks of chip and electrolytic capacitors. Consequently, the residual common mode noise passes through a low pass filter to reach the node 72. This low pass filtered noise may be provided to the PEM common mode noise shunt 22.

Figure 3:
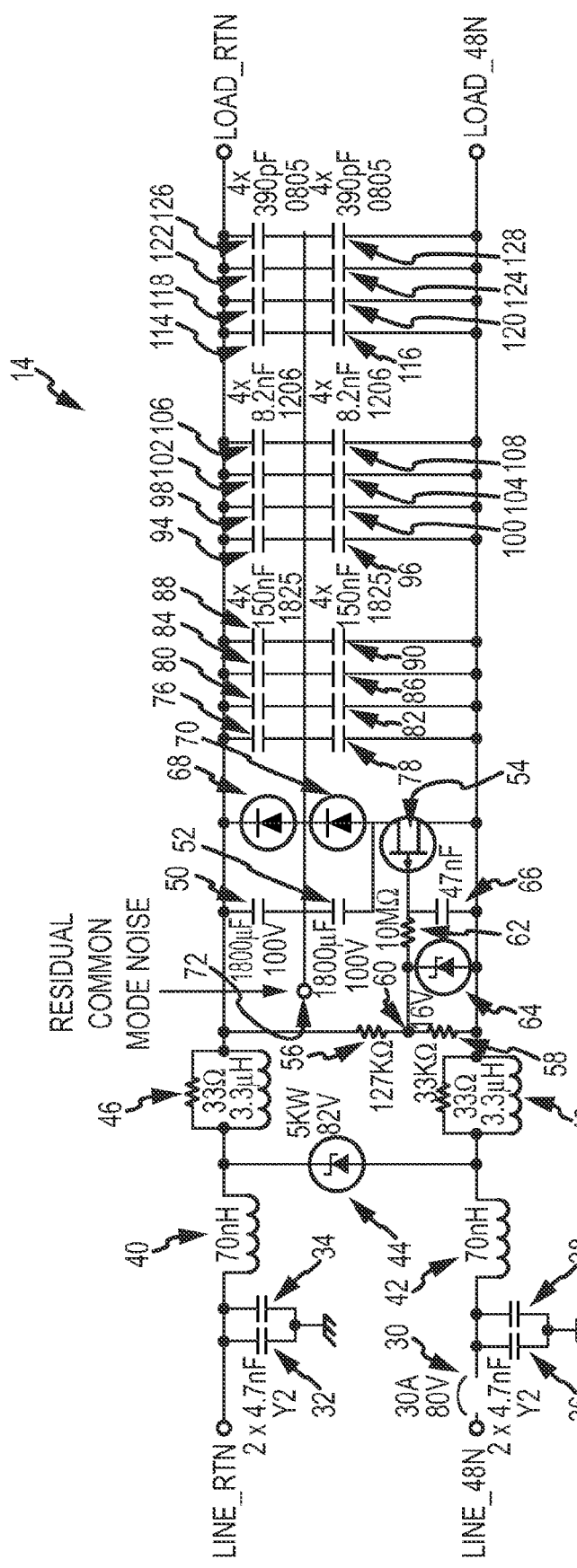
FIG. 3 is a schematic diagram of an exemplary PEM branch circuit of the PEM of FIG. 2.

The schematic will generally be described from left to right as shown in FIG. 3. While specific component values have been given, these are merely examples and it will be understood by a person having ordinary skill in the art that other component values, numbers of components, and different circuit arrangements could be used. A 30 amp (80 volt) fuse 30 is provided on the −48 VDC line. Next, each line has a pair of Y2 capacitors 32, 34, 36, and 38 between it and ground. These capacitors 32, 34, 36, and 38 each have a capacitance of about 4.7 nanoFarads (nF). Next, each power line has an inductor 40, 42 having an inductance of about 70 nanoHenries (nH) placed in series in the power line. As stated previously, these capacitors and inductors serve to help attenuate the high frequency portion of the noise on the power lines.

Following this, a Zener diode 44 may be connected between the power lines to handle transient reverse polarity issues and high voltage surges of correct polarity. The Zener diode 44, in this embodiment, may have a breakdown voltage of 82 V and a power capacity of 5 kW. Reverse biasing can occur from a wiring error outside of the telecommunication chassis 10, during safety tests, or in other ways. Transient voltage surges can occur due to induced currents from nearby lightning strikes, during safety tests, or in other ways. The Zener diode 44 is oriented in polarity such that under normal operating conditions, the diode 44 is reversed biased at a voltage that is below its breakdown voltage. Whenever the power lines have an incorrect polarity, then the diode 44 will be forward biased and will not allow the remainder of the circuitry of the PEM branch circuit 14 to have the reverse polarity voltage applied thereto. Additionally, when a voltage surge enters the PEM (e.g., the PEM 12 of FIG. 2) from the power lines, the diode 44 will be reverse biased to limit the amount of surge energy that can reach the remainder of the PEM branch circuit 14.

Downstream from the Zener diode 44, each power line may have in series therewith a resistor/inductor pair 46 and 48. Each pair 46 and 48, in this embodiment, includes a 33 ohm (Ω) resistor and a 3.3 microHenry (μH) inductor. Each 3.3 μH inductor operates to attenuate lower frequency noise. Each 33Ω resistor operates in series with its interconnected 70 nH inductor (i.e., inductors 40 and 42) to attenuate the high frequency resonance of the remainder of the filter. In the example shown, the resonance of the remainder of the filter peaks at a frequency near 750 MHz. Accordingly, the inductors 40 and 42 are selected to provide a self-resonant frequency of 750 MHz.

Next, there is a portion of circuitry that includes a pair of 1800 microFarad (μF) electrolytic capacitors 50, 52 in series with each other, with each one located between one of the power lines and the common mode noise collection node 72. The in-rush current to these capacitors 50 and 52 is controlled by a field effect transistor (FET) 54 in series with the capacitors 50 and 52. The FET 54 is controlled so as to be turned on gradually by circuitry that includes voltage-division resistors 56 and 58, having a resistance of 127 kΩ and 33 kΩ respectively, that are connected between the power lines, so as to provide a DC voltage to the gate of the FET 54 of approximately 10 V. A node 60 between the resistors 56 and 58 is connected to the gate of the FET 54 through a 10 MΩ resistor 62. The node 60 is also connected to the −48 VDC power line by a Zener diode 64 that is oriented so as to be reversed biased in normal operation. The Zener diode 64 may have a reverse breakdown voltage of 16 V. The gate of the FET 54 may also be connected to the −48 VDC power line by a 47 nF capacitor 66. As can be appreciated, the Zener diode 64 protects the FET 54 by limiting the amount of voltage that can be applied to the gate of the FET 54 to be no greater than 16 V. Together, the RC pair including the resistor 62 and the capacitor 66 causes the FET 54 to turn on slowly as charge builds on the capacitor 66. In turn, this limits the rate at which charge builds on the large electrolytic capacitors 50 and 52 that may provide the bulk of the filtering of the noise. A pair of Schottky diodes 68 and 70 in series with each other are placed in parallel with the electrolytic capacitors 50 and 52 between the FET 54 and the return power line.

Generally, electrolytic capacitors are polarized and, therefore, easily damaged by even small reverse voltages. Although bipolar electrolytic capacitors are available, they have much lower capacitance and breakdown voltages compared with available polarized capacitors (e.g., large commonly available 100 V bipolar electrolytic capacitors have a capacitance of 220 μF, considerably less than the capacitors 50 and 52 which have a capacitance of 1800 μF). Under abnormal power line conditions, the Schottky diodes 68, 70 limit the reverse voltages applied to their respective electrolytic capacitors 50, 52 to less than about ½ V. The node 72 between the capacitors 50 and 52 and also between the diodes 68 and 70 is the point at which residual common mode noise is collected and passed to the PEM common mode noise shunt 22 shown in FIG. 2.

Also connected between the power lines are three different banks of monolithic chip capacitors. Eight such capacitors 76, 78, 80, 82, 84, 86, 88, and 90, each having a capacitance of 150 nF, are connected between the power lines in pairs such that there are four pairs of such capacitors with each pair of capacitors having its capacitors connected in series with each other and parallel to the other three pairs. The point between the capacitors of each pair is also connected to the node 72.

Eight more capacitors 94, 96, 98, 100, 102, 104, 106, and 108 are connected in a similar fashion. These eight capacitors each have a capacitance of 8.2 nF. Additionally, eight more capacitors 114, 116, 118, 120, 122, 124, 126, and 128 are connected in a similar fashion. These eight capacitors each have a capacitance of 390 picoFarads (pF).

In one embodiment, the monolithic chip capacitors are attached to the opposite surface of the Printed Circuit Board (PCB) from their respective large electrolytic capacitors 50, 52 (e.g., directly underneath the capacitors 50, 52). This may minimize the parasitic inductance of each bank of capacitors and generally improve the broadband filter response to near that of an ideal capacitor.

Figure 4:
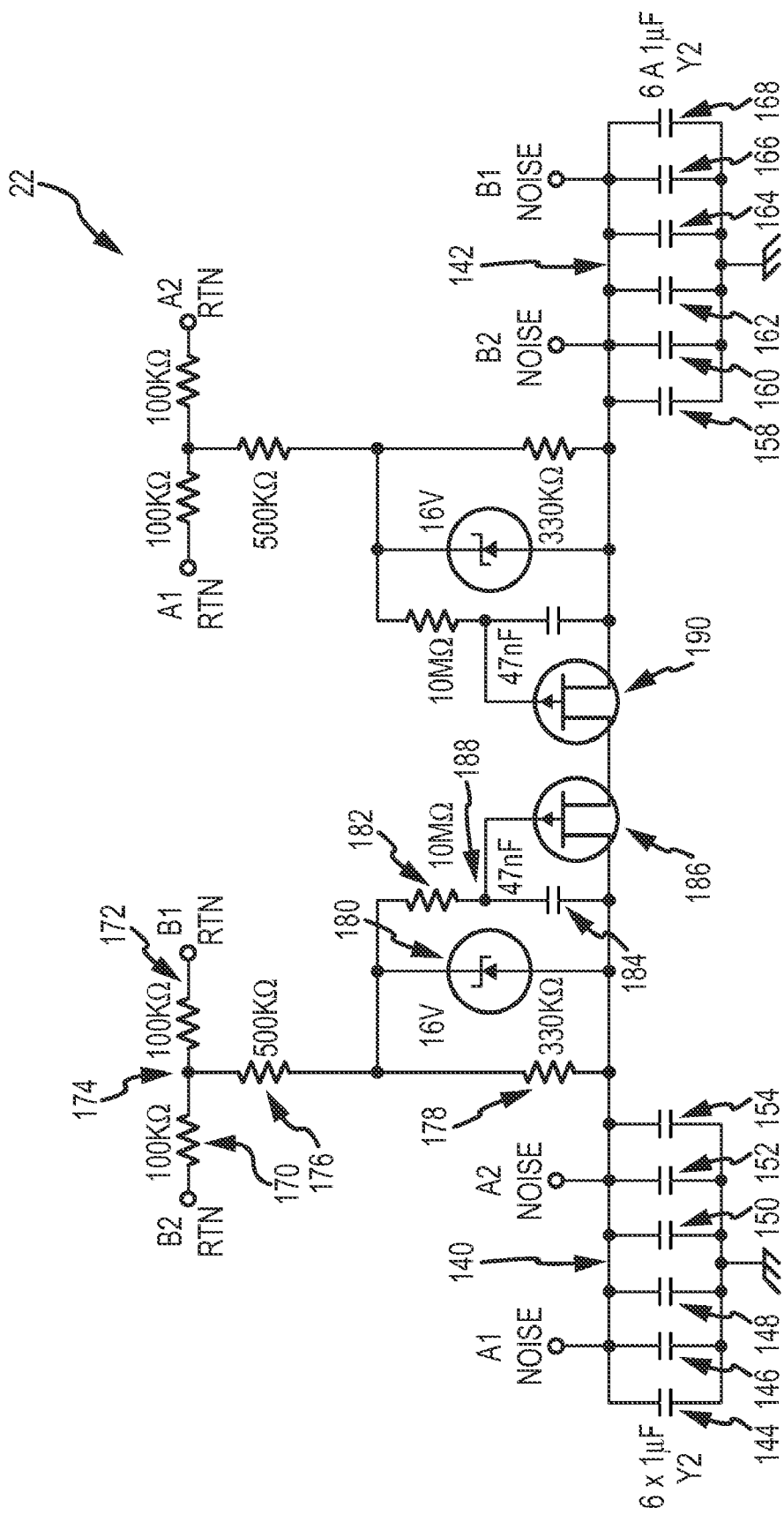
FIG. 4 is a schematic diagram of an exemplary PEM common mode noise shunt of the PEM of FIG. 2.

The PEM common mode noise shunt 22 (shown in FIGS. 2 and 4) is used to connect together the node 72 from more than one of the branch circuits 14, 16, 18, and 20. As shown in FIG. 4, the node 72 from the branch circuit 14 (i.e., A1 noise) is connected together with the same node from the branch circuit 16 (i.e., A2 noise). This point in FIG. 4 will be referred to herein as the node 140. The residual common mode noise of the A power lines of the PEM passes through the node 140. In a similar fashion, the nodes 72 from the branch circuits 18 and 20 (i.e., B1 noise and B2 noise, respectively) are connected together at a node 142 in the common mode noise shunt 22. The residual common mode noise of the B power lines of the PEM passes through the node 142. The node 140 is connected to ground via six Y2 capacitors 144, 146, 148, 150, 152, and 154 connected together in parallel. The capacitors 144, 146, 148, 150, 152, and 154 each have a capacitance of 1 μF. Similarly, the node 142 is connected to ground through six Y2 capacitors 158, 160, 162, 164, 166, and 168, each having a capacitance of 1 μF.

In addition to passing residual common mode noise from the nodes 140 and 142 to ground as previously described, the common mode noise shunt 22 may also pass common mode noise between the nodes 140 and 142. The equivalent series capacitance across this shunt between the A power lines and the B power lines is generally hundreds of times greater than the equivalent series capacitance from any of the A or the B power lines to ground. Consequently, the ability of the filter to attenuate unbalanced noise across the totality of the power lines is increased by at least 20 dB across a very broad bandwidth (e.g., from 10 KHz to 1 GHz). Such is marked improvement when compared to a conventional design employing only the Y2 capacitors.

As shown, the node 140 is connected to the node 142 via two opposing protection FETs 186, 190. In normal operation, the FETs 186, 190 are both turned on forming a very low impedance bidirectional path between nodes 140 and 142. Under abnormal voltage conditions, (e.g., when the external power source for the A1 and A2 power lines is connected to a different ground potential than the source for the B1 and B2 power lines) there can be reverse current flow across the diodes 68 and 70 of the branch circuits 14 and 16 on the A side and reverse current flow across the corresponding diodes of the branch circuits 18 and 20 on the B side. In this regard, the FETs 186, 190 are turned off, thereby protecting the PEM 12 from reverse current flow in either direction between the nodes 140, 142.

The circuits that control the protection FETs 186 and 190 are now described. The FET 186 has a gate connected to a node 188 between a resistor 182 and a capacitor 184. If there is no voltage across the Zener diode 180, then the FET 186 will be turned off. On the other hand, if there is a voltage across the Zener diode 180, then the FET 186 will be turned on at a rate controlled by the resistor 182 and capacitor 184. The gate of the FET 186 is connected to the B1 and B2 return power lines via a resistor network that includes a pair of 100 kΩ resistors 170 and 172 in series between the B1 and B2 return power lines. These resistors 170 and 172 present an average voltage at the node 174. Between the node 140 and is the node 174, are a pair of resistors 176 and 178 in series, which divide the voltage between the node 174 and the node 140 by a ratio of about 2:5 so that the voltage applied to the gate of the FET 186 at the node 188 will be about 40% of the voltage between the return power lines from the B power supply at the node 174 and the net common mode voltage from the A power lines at the node 140. These resistors 176 and 178 may have resistances of 500 kΩ and 330 kΩ, for example. The Zener diode 180 is connected in parallel with the resistor 178 between this divided voltage and the node 140. The Zener diode 180 may have a reverse breakdown voltage of about 16V, generally capable of protecting the gate of the FET 186 from reverse bias and over-voltage conditions. The resistor 182 is connected in series with the capacitor 184, which together are in parallel with the Zener diode 180. As can be appreciated, the resistor network including resistors 170, 172, 176, 178, and 182 together with the Zener diode 180 serve to place a positive voltage at the gate of FET 186 (i.e., the node 188) if the B1 and B2 return power lines are at a higher voltage potential than the common mode voltage at the node 140. Otherwise, no voltage is placed across the Zener diode 180, thereby ensuring that no current will flow across the path formed by the diodes 70 of the A side branch circuits 14 and 16 and the diodes 68 of the B side branch circuits 18 and 20.

It can be seen from FIG. 4 that identical circuitry as just described above exists between the node 142 and the A1 and A2 return power lines. Thus, if the A1 and A2 return power lines are at a safe voltage potential relative to the node 142, a similar FET 190 will be turned on. It can further be appreciated that if both of the FETs 186, 190 are turned on, then the nodes 140 and 142 are essentially joined together. In this manner, the noise at one node can be additionally filtered by the Y2 capacitors on the other side of the circuit in addition to being absorbed through the common mode noise collection node 72 of the other branch circuits 14, 16, 18, and 20.

It should be appreciated that the circuit arrangement of the PEM branch circuits and PEM common mode noise shunt disclosed herein allow for some filtering to be performed with "fail-safe" Y2 capacitors to ground. The remainder of the filtering may be performed with high-capacity capacitors that remain isolated from ground. Additionally, this circuitry has protection built in to protect against reverse polarizing the electrolytic capacitors. For this reason, either polarized or non-polarized capacitors can be used. In large part, the differential noise on the power lines is filtered with the electrolytic capacitors, while the common mode noise that is not filtered by the broad-band inductor-capacitor network in each of the branch circuits 14, 16, 18 and 20 is handled with the common mode noise shunt 22. The Schottky diodes 68 and 70 serve to ensure that any reverse bias across the large capacitors 50 and 52 is low (e.g. less than 0.5 V).

Further, it should be noted that the FET 54 in each of the branch circuits is not in series with the load. Implementations where the FET is in series with the load provide a voltage drop that with high current levels can provide undesirable power and heat dissipation. For example, with 30 amps flowing through the circuit, as much as 9 W may be consumed in such implementations, even with a small voltage drop. Furthermore, the FET 54 limits the current into the capacitors 50 and 52 to a small value, such as a few amps. The large values of the resistors 62 and 182 slow down how fast the FETs 54 and 186 turn on, thereby limiting the charging rates of the interconnected capacitors when power is first turned on. The capacitors 66 and 184 in series with the resistors 62 and 182 regulate the delays before the FETs 54 and 186 begin to turn on. Without these limits, an initial inrush of currents on the power lines could reach hundreds of Amperes.

From the foregoing descriptions it can be seen that the currents flowing through the FETs 54, 186, and 190 are very small when compared to the currents flowing through the power lines. Therefore these FETs 54, 186, and 190 do not consume any significant power; nor do they generate any significant heat or otherwise impede the normal operation of the PEM 12.

Figure 5:
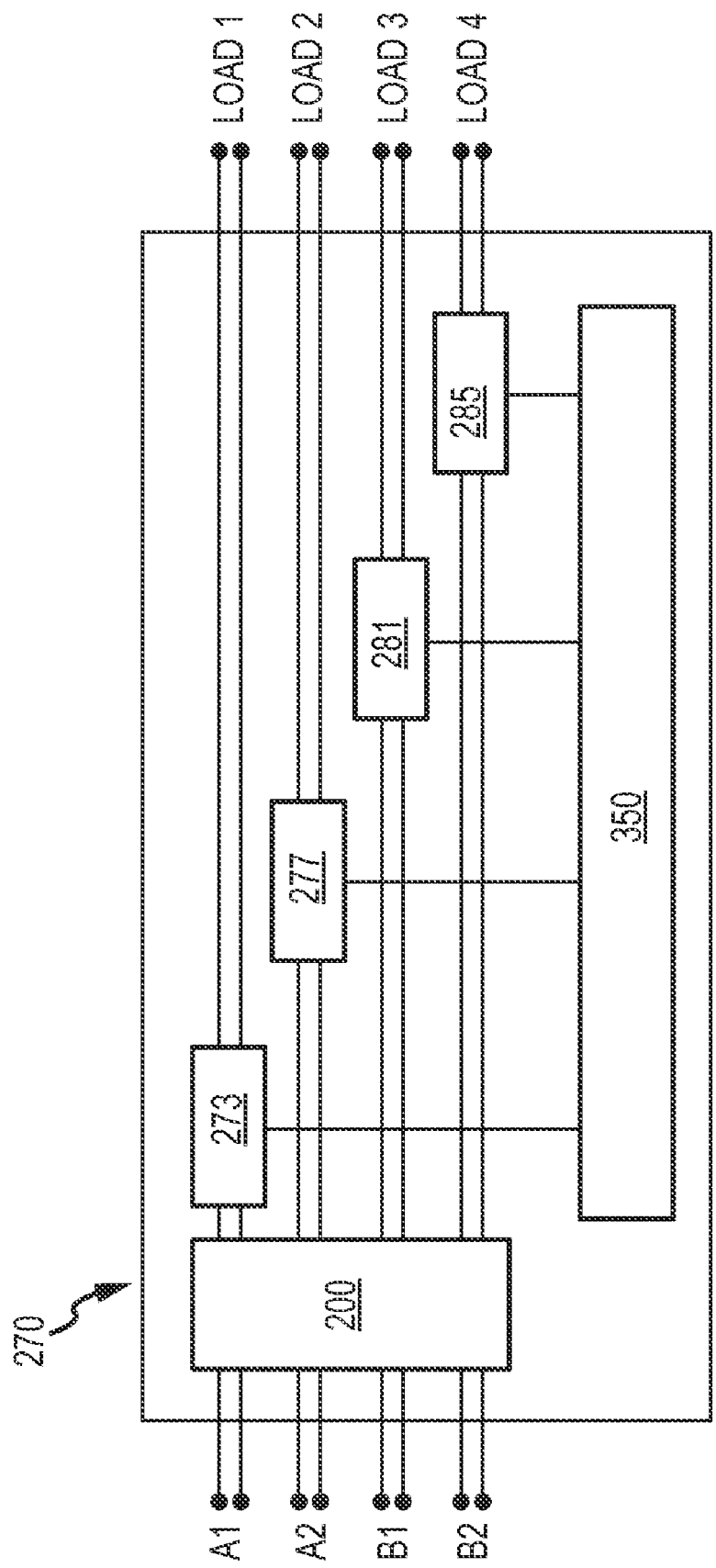
FIG. 5 is a simplified block diagram of an alternate embodiment of a PEM.

Turning now to FIG. 5, a simplified block diagram of another embodiment of a PEM 270 is shown. As can be seen, the PEM 270 includes four PEM branch circuits 273, 277, 281, and 285 that each receive input power from a different one of the power line pairs A1, A2, B1, B2 and that each supply power to a different one of the loads (e.g., Load1, Load2, Load3, Load4). In this embodiment, the branch circuits 273, 277, 281, and 285 may be protected from abnormal conditions on the power lines by a line side protection circuit 200. As described in further detail below, the protection circuit 200 may interconnect more than one branch circuit together. Furthermore, each of the branch circuits 273, 277, 281, and 285 may also be connected to a PEM common mode noise shunt 350.

Figure 6:
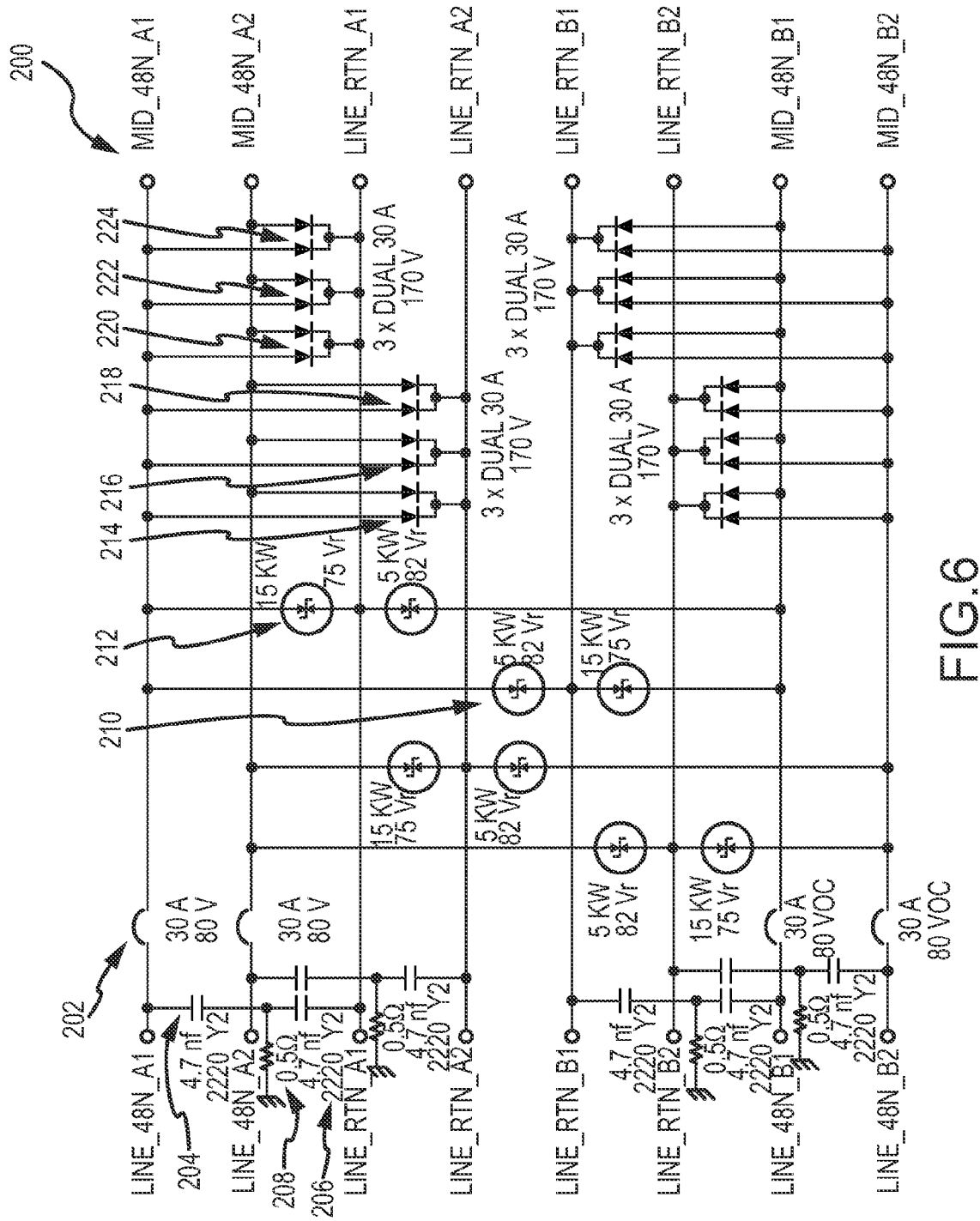
FIG. 6 is a schematic diagram of an exemplary PEM line side protection circuit of the PEM of FIG. 5.
Figure 7:
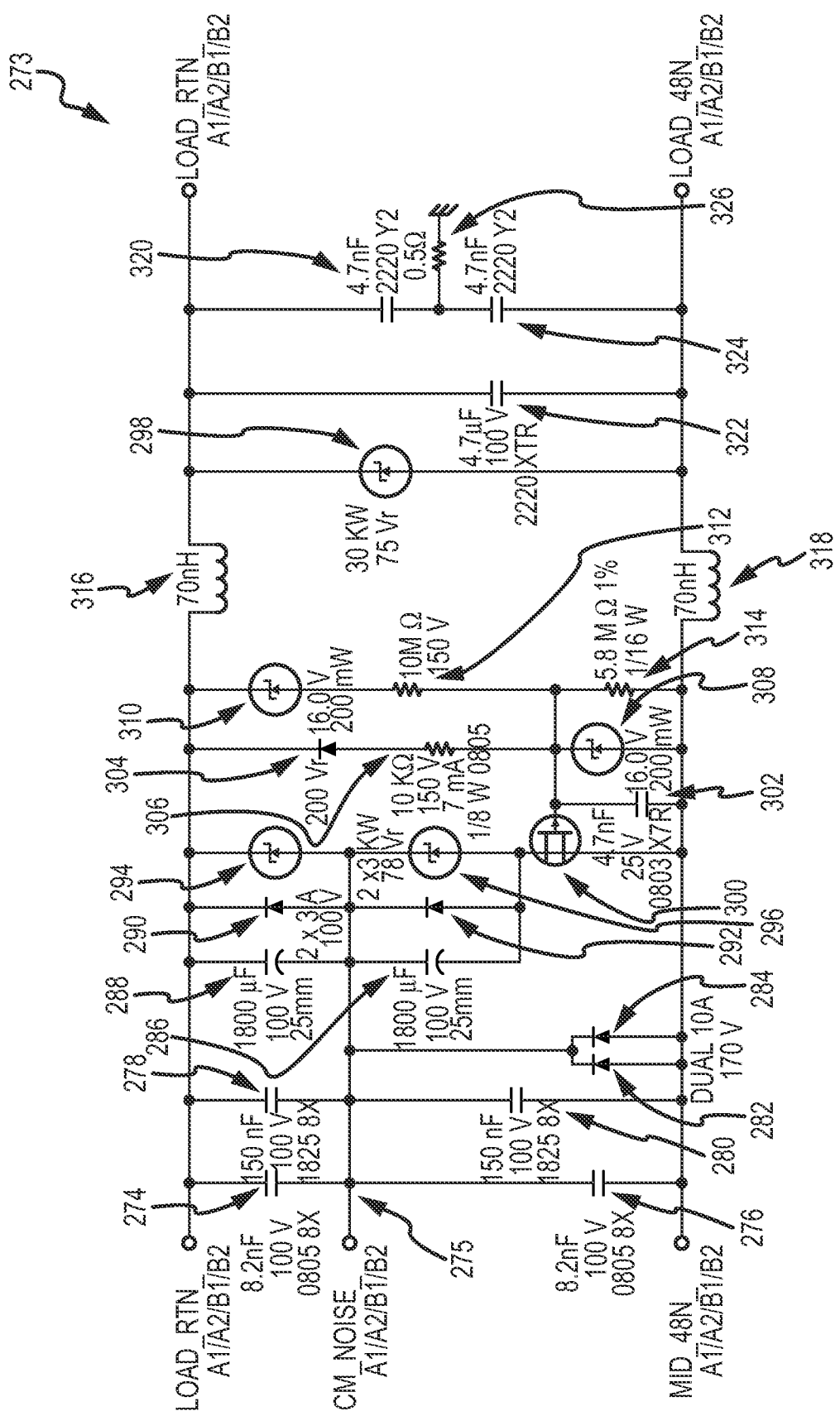
FIG. 7 is a schematic diagram of an exemplary PEM branch circuit of the PEM of FIG. 5.
Figure 8:
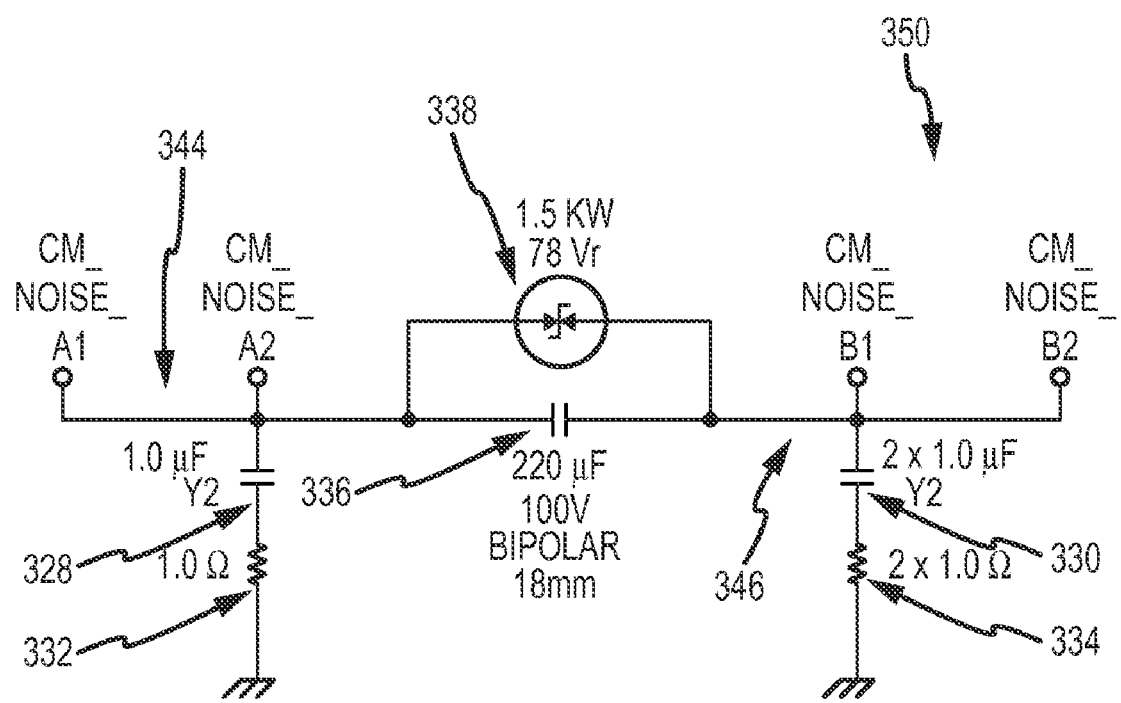
FIG. 8 is a schematic diagram of an exemplary PEM common mode noise shunt of the PEM of FIG. 5.

FIGS. 6-8 illustrate schematic diagrams for the PEM 270. A schematic diagram of the line side protection circuit 200 is shown in FIG. 6. As above, the schematic diagram will generally be described from left to right. Additionally, as each of the branch circuits 273, 277, 281, and 285 are substantially identical, a detailed description of only the branch circuit 273 is described. First, a feed-through filter including a pair of Y2 capacitors 204, 206 is provided by coupling the −48 VDC power line and the return power line to ground. The capacitors 204, 206 may each have a capacitance of 4.7 nF, and operate primarily to couple high frequency differential and common mode line noise to ground. A 0.5Ω resistor 208 may be placed between the capacitors 204, 206 and ground to dampen reflections. Additionally, a 30 amp (80 volt) circuit breaker 202 may be provided on the −48 VDC line to protect the circuitry from surges. The circuit breaker 202 may be any device that is operable to automatically stop the flow of electrical current when the circuitry is abnormally stressed. By way of example, the circuit breaker 202 may be a fuse.

Following the feed-through filter, circuitry may be provided to protect against surges and reverse biasing. The line side protection circuit 200 may include a bidirectional transient voltage suppressor (TVS) 210 coupled between the −48 VDC of the A1 power line and the B1 return power line. The TVS 210, in this embodiment, may have a rated standoff voltage of 82 V, a clamping voltage of 91 V, and a peak pulse power dissipation of 5 kilowatts (kW). The line side protection circuit 200 may also include a TVS 212 that is coupled between the −48 VDC of the A1 power line and the A1 return power line. In this embodiment, the TVS 212 may have a rated standoff voltage of 75 V, a clamping voltage of 83.3 V, and a peak pulse power dissipation of 15 kW. The TVSs 210, 212 provide the primary protection from line side power disturbances. The TVS 210 dissipates common mode surge energy between the A1 circuit and the B1 circuit, while the TVS 212 dissipates differential mode energy between the −48 VDC and the return power line of the A1 circuit. As can be seen, in a similar manner, each power line may have a TVS 210 and a TVS 212 between it and one of the return power lines. Additionally, the circuit may include the power diodes 214, 216, 218 coupled between the −48 VDC of the A1 power line and the A2 return power line, and the power diodes 220, 222, 224 coupled between the −48 VDC of the A1 power line and the A1 return power line. The power diodes may be dual common-cathode diodes with separate connections to the −48 VDC of two power lines (e.g., A1 and A2 power lines) and a common connection to a single return power line (e.g., A1 return power line). The power diodes 214, 216, 218, 220, 222, 224 primarily handle line side reverse polarity issues that may arise, for example, when there is a wiring error outside of the telecommunications chassis. Any reverse currents flowing through the −48VDC of the A1 power line is spread equally across six parallel diodes and two parallel return power lines (i.e., A1 and A2 return power lines). The multiple power diodes in parallel can pass thousands of amperes of reverse current for a sufficiently long duration to trip the circuit breaker 202. Using dual common-cathode or dual common-anode diodes has the advantage of sharing the thermal stress caused by power surges across multiple diodes as well as multiple branch circuits. Similarly, power diodes may also be provided for the other power lines.

Turning now to FIG. 7, an exemplary branch circuit filter 273 is shown. The branch circuit filter 273 first includes a capacitive line filter that provides the primary attenuation for both differential and common mode noise. The capacitive line filter may include a pair of 8.2 nF monolithic chip capacitors 274, 276 positioned in series with each other with each one located between one of the power lines and a common mode noise collection node 275. Similarly, a pair of 150 nF monolithic chip capacitors 278, 280 may be positioned in the same configuration. The capacitors 274, 276, 278, 280 may generally operate to attenuate high frequency common mode noise.

The capacitive line filter may also include a pair of 1800 μF electrolytic capacitors 286, 288 in series with each other between the power lines and the common mode noise node 275. The in-rush current to the capacitors 286, 288 may be controlled by a FET 300 in series with the capacitors 286, 288. The FET 300 may be controlled so as to be turned on gradually by circuitry that includes voltage division resistors 312 and 314, having a resistance of 10 MΩ and 5.6 MΩ respectively, and a 16 V Zener diode 310 that are connected together in series between the power lines. Additionally, the gate of the FET 300 may be connected to the −48 VDC power line by a Zener diode 308 that is oriented so as to be reverse biased in normal operation. The Zener diode 308 may have a reverse breakdown voltage of about 16 V, and may protect the FET 300 by limiting the amount of voltage that can be applied to the gate of the FET 300 to be no greater than about 16 V. Additionally, the gate of the FET 300 may be connected to the −48 VDC power line by a 47 nF capacitor 302. Together with a 10 kΩ resistor 306 and a diode 304, the capacitor 302 may operate to cause the FET 300 to turn on slowly as charge builds on the capacitor 302. In turn, this may limit the rate at which charge builds up on the capacitors 286, 288 that may provide the bulk of the noise filtering.

As described previously, electrolytic capacitors are generally polarized, and therefore, easily damaged by small reverse voltages. Under abnormal power conditions, the capacitors 286, 288 may be protected from over-voltage and reverse biasing by two parallel unidirectional TVSs 294, 296 in series with each other and between the power lines and the common mode noise collection node 275. The TVSs 294, 296 may, in this embodiment, have a rated standoff voltage of 78 V, a clamping voltage of 86.7 V, and a peak pulse power dissipation of 3 kW. Additionally, the capacitors 286, 288 may be protected by the diodes 290, 292 positioned in a similar configuration as the TVSs 294, 296.

Next, the branch circuit filter 273 may include an inductive filter stage between the capacitive line filter and a capacitive load filter that generally operates to flatten the high frequency differential and common mode noise across capacitive filters. The inductive filter stage may, in this embodiment, include two 70 nH inductors 316, 318 placed in series on the return power line and the −48 VDC power line, respectively.

After the inductive filter, the branch circuit filter 273 may include a capacitive load filter that generally operates to attenuate high frequency differential and common mode noise. The capacitive load filter may include a 4.7 μF monolithic chip capacitor 322 between the −48 VDC power line and the return power line. The capacitor 322 may operate to attenuate high frequency differential noise, as well as to buffer surge currents that may be imposed by the inductive filter. The capacitive load filter may also include a pair of 4.7 nF Y2 chip capacitors 320, 324 that are each coupled from one of the power lines to ground through a 0.5Ω resistor 326. The capacitors 320, 324 may generally operate to couple very high frequency differential and common mode load noise to ground. Additionally, the resistor 326 may operate to dampen the reflections across the inductors 316, 318 between the capacitive line filter and the capacitive load filter. Additionally, the TVS 298 may operate to dampen the current reflections across the output side of the branch circuit 273 that may occur when a load circuit (e.g., Load1, Load2, Load3, or Load4) is dynamically added or removed from the output side of the PEM 270. In this embodiment, the TVS 298 may have a rated standoff voltage of 75 V, a clamping voltage of 83.3 V, and a peak pulse power dissipation of 30 kW.

Similar to the previously described embodiment, a PEM common mode noise shunt 350 may be used to connect together the common mode noise collection node 275 from more than one of the branch circuits 273, 277, 281, and 285. As shown in FIG. 8, the node 275 from the branch circuit 273 (i.e., A1 noise) is connected together with the same node 275 from the branch circuit 277 (i.e., A2 noise) at a node 344. The residual common mode noise of the A power lines of the PEM may then pass through the node 344, where it may be shunted to ground through a 1 μF Y2 capacitor 328 in series with a 1 Ω resistor 332. In similar fashion, the node 275 from the branch circuits 281 and 285 (i.e., B1 noise and B2 noise, respectively) are connected together at a node 346 in the common mode noise shunt 350. The residual common mode noise of the B power lines of the PEM may then pass through the node 346, where it may be shunted to ground through a 1 μF Y2 capacitor 330 in series with a 1Ω resistor 334.

In addition to passing residual common mode noise from the nodes 344 and 346 to ground as previously described, the common mode noise shunt 350 may also pass common mode noise between the nodes 344 and 346 through a bridge formed by a 220 μF bipolar electrolytic capacitor 336. As can be appreciated, the bridge may also be formed using two or more polarized capacitors. The bridge may operate to allow pooling of the common mode filter capacity across both the A and B sides of the common mode noise shunt 350. Furthermore, for added protection against surges, a bidirectional TVS 338 in parallel with the capacitor 336 may be provided.

It should be appreciated that the power filter disclosed herein offers several advantages to prior designs. It is believed that having a FET (e.g., the FETs 54, 300) in series with the filter capacitors rather than in series with the load is novel. It is also believed that using the diodes and TVSs to prevent reverse bias of the filter capacitors is novel. It is also believed that using a mesh structure of TVSs, connected in one dimension across the two legs of a single branch circuit to dissipate differential mode voltage surges, and connected in the other dimension across the corresponding legs of different branch circuits to dissipate common mode voltage surges, is novel. It is also believed that the use of a common mode noise shunt to shunt off common mode noise to other circuitry rather than to ground is novel. It is also believed that such a common mode noise shunting operation may be useful because noise sources may not be in phase with each other and may to some extent cancel each other out. It is also noted that when the common mode noise is passed from the common mode noise collection node in one branch circuit to the common mode noise collection node in another branch circuit, the common mode noise will have to pass back through another filter capacitor on the way back to the power lines in the second circuit. In effect, what is occurring is the pooling together of attenuated versions of noise from different circuits.

The foregoing description has been presented for purposes of illustration and description. Furthermore, the description is not intended to limit the invention to the form disclosed herein. While a number of exemplary aspects and embodiments have been discussed above, those of skill in the art will recognize certain variations, modifications, permutations, additions, and sub-combinations thereof. Accordingly, it should be understood that the particular values of the circuit component's described herein could be varied and achieve the same objectives. The values given herein are merely exemplary. It is therefore intended that the following appended claims and claims hereafter introduced are interpreted to include all such variations, modifications, permutations, additions, and sub-combinations as are within their true spirit and scope.

What is claimed is:

1. A circuit in a telecommunications chassis that receives DC power from a plurality of power line pairs and provides power to a plurality of loads within the chassis, the circuit comprising:
   a plurality of branch circuits, each branch circuit being associated with one of the power line pairs and connected to one or more loads within the chassis, each branch circuit including a plurality of capacitors therein to filter out noise; and
   a common mode noise shunt that is coupled to each of the plurality of branch circuits, wherein the common mode noise shunt couples together common mode noise from more than one of the branch circuits to provide filtering of the common mode noise.

2. The circuit of claim 1, further comprising a field effect transistor disposed in series with at least one of the plurality of capacitors.

3. The circuit of claim 2, further comprising a Zener diode that is operable to limit the voltage potential on the gate of the field effect transistor.

4. The circuit of claim 1, further comprising a capacitor protection network that is operable to protect the plurality of capacitors from abnormal power conditions in the circuit.

5. The circuit of claim 4, wherein the capacitor protection network includes at least one diode.

6. The circuit of claim 4, wherein the capacitor protection network includes at least one transient voltage suppressor.

7. The circuit of claim 1, wherein the common mode noise shunt includes a bridge that couples more than one branch circuit together.

8. The circuit of claim 7, wherein the bridge includes a field effect transistor.

9. The circuit of claim 8, wherein the bridge includes two opposing field effect transistors.

10. The circuit of claim 7, wherein the bridge includes a capacitor.

11. The circuit of claim 1, wherein the common mode noise shunt includes at least one capacitor that couples common mode noise from more than one branch circuit to ground.

12. A circuit in a telecommunications chassis that receives DC power from a plurality of power line pairs and provides power to a plurality of loads within the chassis, the circuit comprising:
    a plurality of branch circuits, each branch circuit being associated with one of the power line pairs and connected to one or more loads within the chassis, each branch circuit including a plurality of capacitors therein to filter out noise; and
    a plurality of protection circuits, each protection circuit being coupled to more than one of the branch circuits, wherein the plurality of protection circuits operate to protect the circuit from abnormal power conditions.

13. The circuit of claim 12, wherein each protection circuit includes:
    a first transient voltage suppressor coupled to more than one of the branch circuits, the first transient voltage suppressor being operable to protect the circuit from common mode power surges; and
    a second transient voltage suppressor coupled to a supply power line and a return power line of one of the branch circuits, the second transient voltage suppressor being operable to protect the circuit from differential mode power surges.

14. The circuit of claim 12, wherein each protection circuit includes:
    a first diode coupled to more than one of the branch circuits, the first diode being operable to protect the circuit from reverse biased voltage potentials across multiple branch circuits; and
    a second diode coupled to a supply power line and a return power line of one of the branch circuits, the second diode being operable to protect the circuit from reverse biased voltage potentials across a single branch circuit.

15. The circuit of claim 14, wherein the first and second diodes are dual common cathode or dual common anode diodes.

16. The circuit of claim 12, further comprising a common mode noise shunt that is coupled to each of the plurality of branch circuits, wherein the common mode noise shunt couples together common mode noise from more than one of the branch circuits to provide filtering of the common mode noise.

17. The circuit of claim 16, wherein the common mode noise shunt includes a bridge that couples more than one branch circuit together.

18. The circuit of claim 17, wherein the bridge includes a field effect transistor.

19. The circuit of claim 18, wherein the bridge includes two opposing field effect transistors.

20. The circuit of claim 17, wherein the bridge includes a capacitor.

21. A circuit in a telecommunications chassis that receives DC power from a plurality of power line pairs and provides power to a plurality of loads within the chassis, the circuit comprising:
    a plurality of branch circuits, each branch circuit being associated with one of the power line pairs and connected to one or more loads within the chassis, each branch circuit including a plurality of capacitors therein to filter out noise; and
    a field effect transistor disposed in series with at least one of the plurality of capacitors.

22. The circuit of claim 21, further comprising a Zener diode that is operable to limit the voltage potential on the gate of the field effect transistor.

23. The circuit of claim 21, further comprising a common mode noise shunt that is coupled to each of the plurality of branch circuits, the common mode noise shunt being operable to couple together common mode noise from more than one of the branch circuits to provide filtering of the common mode noise, wherein the common mode noise shunt includes a bridge that couples more than one branch circuit together, and wherein the bridge includes a capacitor.

24. The circuit of claim 21, wherein the field effect transistor is not in series with any of the plurality of loads.

25. The circuit of claim 21, further comprising a plurality of protection circuits, each protection circuit being coupled to more than one of the branch circuits, wherein the plurality of protection circuits operate to protect the circuit from abnormal power conditions.

* * * * *